(12) United States Patent
Mello et al.

(10) Patent No.: US 6,186,059 B1
(45) Date of Patent: Feb. 13, 2001

(54) METHOD OF GRADING PORK BELLIES

(75) Inventors: Frank C. Mello, Columbus, OH (US); Jeffrey A. Williams, Calhoun, GA (US); Kenneth M. Ware, Cedar Bluff, MS (US)

(73) Assignee: Sara Lee Corporation, Winston-Salem, NC (US)

( * ) Notice: Under 35 U.S.C. 154(b), the term of this patent shall be extended for 0 days.

(21) Appl. No.: 09/392,190

(22) Filed: Sep. 9, 1999

(51) Int. Cl.[7] .................................................. B30B 13/00

(52) U.S. Cl. .............................. 100/35; 100/99; 100/910; 426/231

(58) Field of Search .............................. 100/910, 35, 156, 100/91, 99; 426/231; 356/383; 177/25.15; 452/158; 209/3, 659

(56) References Cited

U.S. PATENT DOCUMENTS

| | | | | |
|---|---|---|---|---|
| 1,940,035 | * | 12/1933 | Washburn | 100/910 |
| 5,064,667 | * | 11/1991 | Mally | 426/231 |
| 5,481,466 | * | 1/1996 | Carey | 356/383 |
| 5,656,799 | * | 8/1997 | Ramsden et al. | 177/25.15 |
| 5,902,177 | * | 5/1999 | Tessier et al. | 452/158 |

* cited by examiner

Primary Examiner—Peter Vo
Assistant Examiner—Louis K. Huynh
(74) Attorney, Agent, or Firm—Kilpatrick Stockton LLP; Charles Y. Lackey

(57) ABSTRACT

A method of grading pork bellies which involves flattening the bellies to a pre-selected thickness with a pressure roller. The bellies are measured at a number of locations to establish an average thickness and thereafter selectively directed to collecting areas based on their thickness and surface area. The collected bellies are then given final grades based on their leanness and quality and moved on for further processing.

12 Claims, 3 Drawing Sheets

METHOD OF GRADING PORK BELLIES

BACKGROUND OF THE INVENTION

1. Field of the Invention

The present invention relates to the selection of pork bellies with respect to leanness and quality and more particularly to a method of grading pork bellies by flattening them to a pre-selected thickness and measuring the thickness at a plurality of locations to establish an average thickness and grade.

2. Description of the Prior Art

In the conventional grading of pork bellies, the bellies are mechanically weighed into various weight grades. Those grades are usually classified 12 lbs and below, 12 lbs–14 lbs, 14 lbs–16 lbs, and so on. These weight grades have traditionally been reflective of varying size hogs which in turn determine the various sizes of bellies. Belly thickness had a direct relationship to the fatness or leanness of bellies, and the fatness or leanness of bellies had direct impact on bacon quality. Generally thinner (leaner) bellies were of higher quality and were worth more.

In today's meat industry, and because of improved genetics and nutritional management, heavier bellies are not necessarily lower in quality. Various methods have been developed mechanically, through either manual or automatic means, to grade pork bellies by thickness. While these have been reasonably successful, there is a need to more precisely grade pork bellies taking into consideration the thickness and surface area to establish greater leanness and higher quality. It is to this need that the present invention is directed.

OBJECTIONS AND SUMMARY OF THE INVENTION

It is a principal objective of the present invention to provide a process for grading pork bellies by average thickness rather than by weight.

A further objective of the present invention is to categorize pork bellies into different thickness grades such as, for example, 0.75 inches or less, 0.75 inch or less, 0.75 to 1 inch, 1 inch to 1.5 inches, 1.5 inches to 2 inches and 2 inches and greater.

Yet another objective of the present invention is to provide a process to mechanically flatten the belly before the grading operation is commenced.

Still another objective of the present invention is to grade the flattened pork bellies with beams of light, preferably lasers, at a number of different locations to obtain an average thickness.

Still yet another further objective of the present invention is to provide a pork belly grading process wherein the graded pork bellies are mechanically sorted into containers for further processing.

Still another objective of the present invention is to correlate the belly thickness with belly surface area to arrive at a method for grading bellies into grades varying in thickness and area and relate those parameters to quality and yield.

The method of the present invention includes directing a continuous supply of pork bellies along a predetermined line of travel and flattening the pork bellies to a pre-selected thickness utilizing a pressure roller. The flattened bellies are then measured according to thickness in several different locations to obtain an average thickness by utilizing beams of light such as lasers. Thereafter, the bellies are selectively moved to collecting areas based on thickness and surface area where they are finally graded in accordance with thickness and surface area as these dimensions relate to leanness and quality.

Thus, there has been outlined, rather broadly, the more important features of the invention in order that the detailed description that follows may be better understood and in order that the present contribution to the art may be better appreciated. There are, obviously, additional features of the invention that will be described hereinafter in which will form the subject matter of the claims appended hereto. In this respect, before explaining several embodiments of the invention in detail, it is to be understood that the invention is not limited in its application of the details and construction and to the arrangement of the components set forth in the following description or illustrated in the drawings. The invention is capable of other embodiments and of being practiced and carried out in various ways.

It is also to be understood that the phraseology and terminology used herein are for the purpose of description and should not be regarded as limiting in any respect. Those skilled in the art will appreciate the concept upon which this disclosure is based and that it may readily be utilized as a basis for designating other structures, methods and systems for carrying out the several purposes of the invention. It is also to be understood that the abstract is neither intended to define the invention of the application, which is measured by its claims, nor to limit its scope in any way.

This summary and these objectives of the invention, along with the various features of novelty which characterize the invention, are pointed out with particularity in the claims annexed to and forming a part of this disclosure. For a better understanding of the invention, its operating advantages, and the specific objects obtained by its use, reference should be made to the accompanying drawings and descriptive matter in which like characters of reference designate like parts throughout the several views.

DETAILED DESCRIPTION OF THE PREFERRED EMBODIMENT

Figure 1:
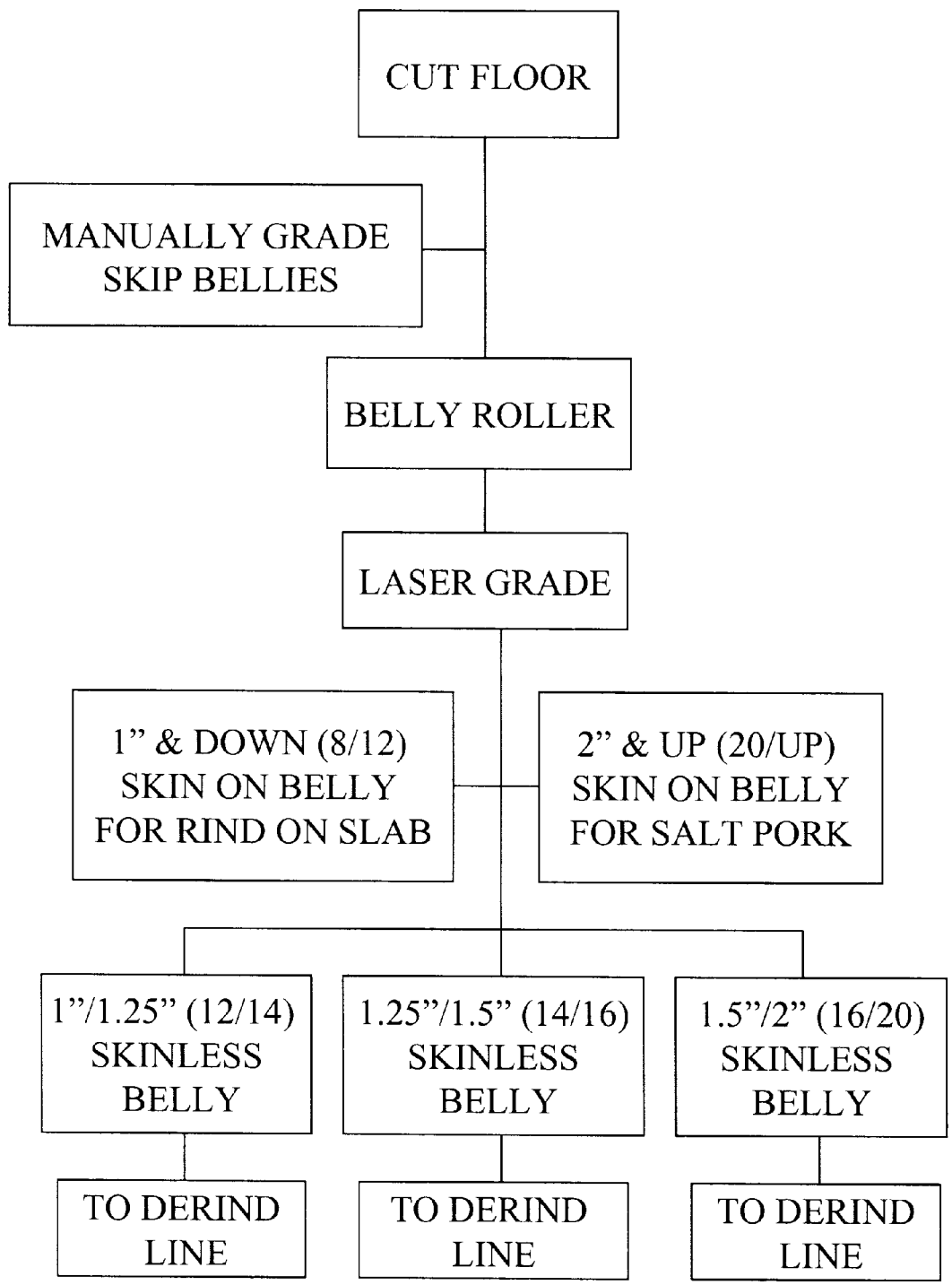
FIG. 1 is a block diagram of the steps involved in the process comprising the present invention.
Figure 2:
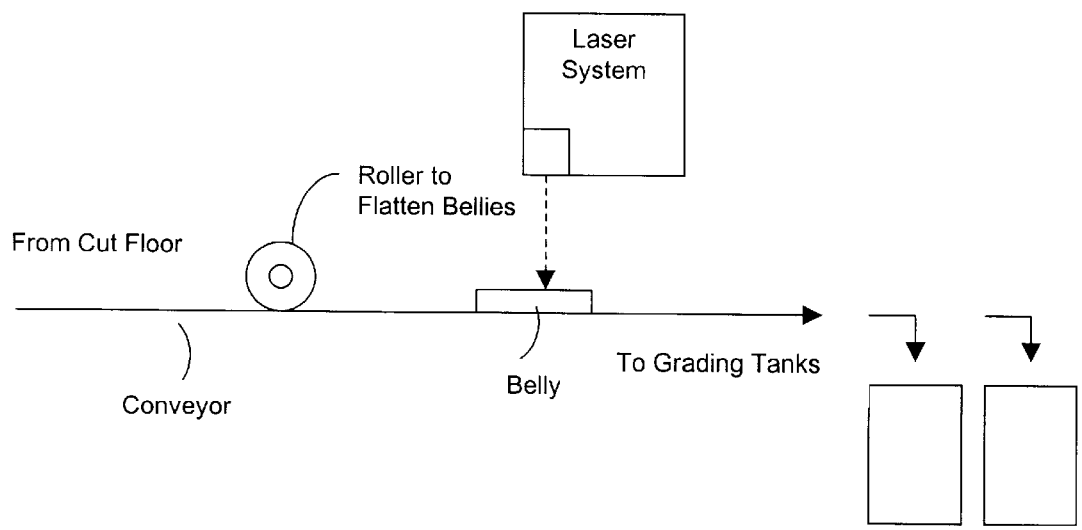
FIG. 2 is a side elevational schematic view of the steps of the process comprising the present invention.
Figure 3:
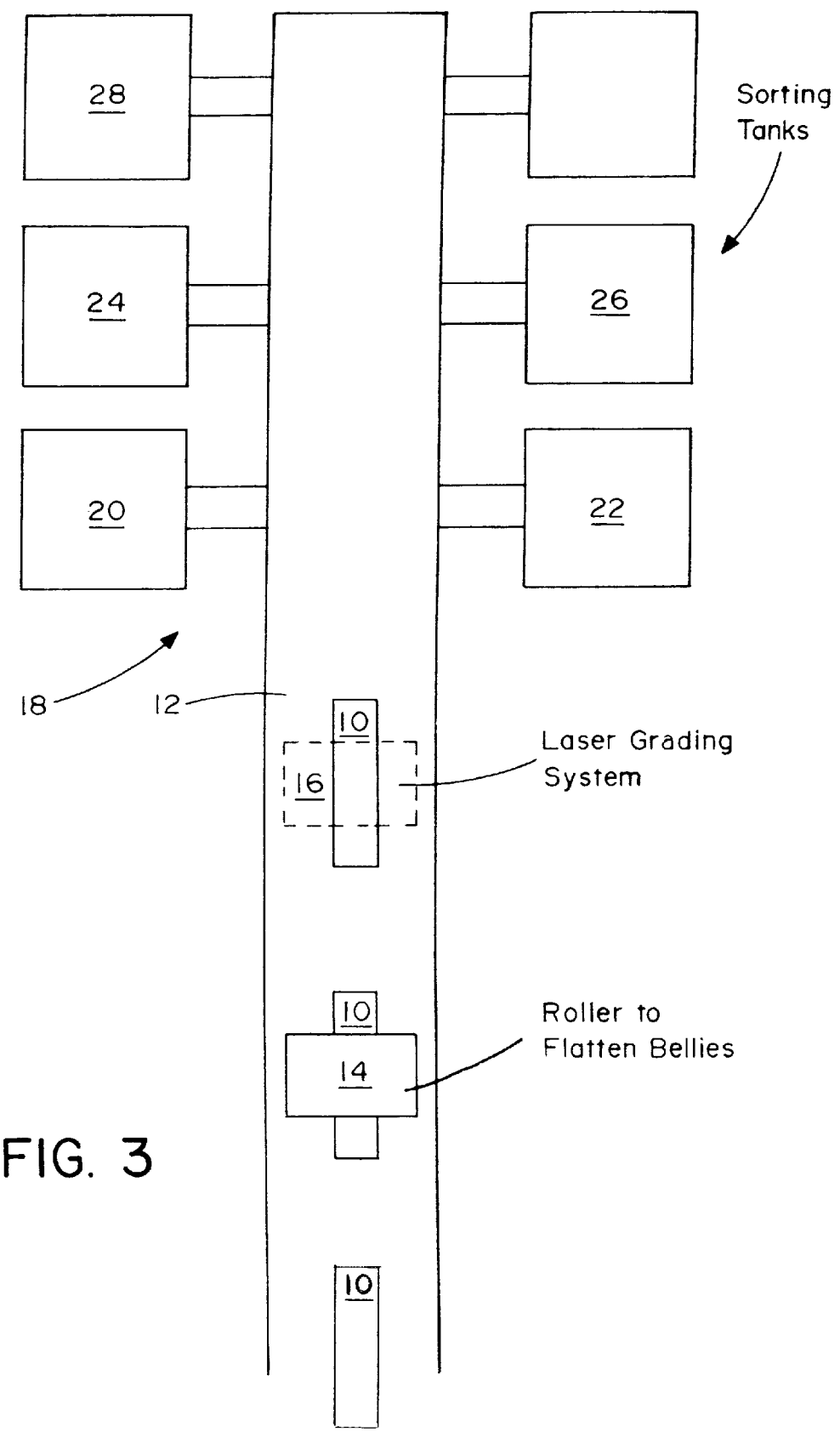
FIG. 3 is a plan and schematic view of the process illustrated in FIG. 2.

Referring now to the drawings and particularly to FIG. 3, pork bellies 10 are sequentially placed on a conveyor 12 for movement in a pre-determined direction (see arrow). They have been manually graded to a limited extent to remove obvious defective bellies from the process so that those positioned on conveyor 12 are deemed to be productively usable once grading has been accomplished.

Bellies 10 proceed to pressure roller 14 where they are substantially flattened for the purpose of achieving some uniformity in thickness and removing irregular curvatures or edges.

After bellies 10 have been flattened by roller 14, they move to laser station 16 where a plurality of laser beams located all along the station sufficient to encompass the width of any belly 10 being moved therethrough. The numerous lasers measuring belly 10 result in an average thickness being determined.

Various collecting containers shown generally as 18 are located near the end of conveyor 12, and automatic mechanical sorting directs the graded bellies 10 into a specific container. For example, bellies measuring one inch thick or below (from 12 lbs–14 lbs in weight) are directed to a specific container 20 and may be made into bacon with skin retained on the meat. Another container 22 will receive bellies measuring 2 inches and up (weighing over 20 lbs) and will be used for special meat mixed with beans and other food products. Skinless bellies for making bacon are then directed to container 24 (1 inch to 1.25 inches thick and from 12 lbs–14 lbs in weight), to container 26 (from 1.25 inches to 1.5 inches thick and from 14 lbs–16 lbs in weight), and to container 28 (from 1.5 inches to 2 inches in thickness and from 16 lbs–20 lbs in weight).

The graded bellies for bacon are thereafter moved to the derind line where operators square up the shape of the belly by removing fat and lean meat thus enhancing the slicing operation.

Thus there has been described a new process for grading pork bellies that serves to relate belly thickness directly to leanness and quality. There may be many modifications, alterations and changes made in the process without departing from the scope or the spirit of essential characteristics thereof. It is thus clearly understood that the described embodiment is only illustrative and is not restrictive in any sense. The scope and spirit of the present invention are limited only by the terms of the appended claims.

What is claimed is:

1. A method of grading pork bellies comprising:
    directing a continuous supply of pork bellies along a predetermined line of travel;
    flattening the pork bellies;
    classifying each moving pork belly according to thickness by measuring the pork belly thickness at a plurality of locations to establish an average thickness;
    selectively directing the measured pork bellies to collecting areas based on the average thickness and surface area of the pork bellies; and
    designating grades for the pork bellies based on the average thickness and surface area to establish leanness and quality.

2. The method as claimed in claim 1, wherein the pork bellies are flattened by a roller.

3. The method as claimed in claim 2, wherein the thickness of the pork bellies is measured by a plurality of beams of light.

4. The method as claimed in claim 2, wherein measured pork bellies are selectively directed to collecting areas by mechanical sorting means.

5. The method as claimed in claim 1, wherein the thickness of the pork bellies is measured by a plurality of beams of light.

6. The method as claimed in claim 5, wherein the light beams are lasers.

7. The method as claimed in claim 4, wherein measured pork bellies are selectively directed to collecting areas by mechanical sorting means.

8. The method as claimed in claim 5, wherein measured pork bellies are selectively directed to collecting areas by mechanical sorting means.

9. The method as claimed in claim 8, wherein the light beams are lasers.

10. The method as claimed in claim 1, wherein measured pork bellies are selectively directed to collecting areas by mechanical sorting means.

11. The method as claimed in claim 1, wherein the pork bellies are graded according to thickness and categories of thicknesses of 0.75 inch or less, from 0.75 to 1 inch, 1 inch to 1.5 inches, 1.5 inches to 2 inches, and greater than 2.5 inches.

12. The method as claimed in claim 1, further comprising removing defective bellies prior to directing the continuous supply of pork bellies along the predetermined line of travel.

* * * * *

UNITED STATES PATENT AND TRADEMARK OFFICE
CERTIFICATE OF CORRECTION

PATENT NO. : 6,186,059 B1  
DATED : February 13, 2001  
INVENTOR(S) : Mello et al.

Page 1 of 1

It is certified that error appears in the above-identified patent and that said Letters Patent is hereby corrected as shown below:

Claim 7,
Line 1, the claim reference numeral "4" should read -- 6 --.

Claim 11,
Lines 4-5, that portion reading "greater than 2.5 inches" should read -- greater than 2 inches --.

Signed and Sealed this

Eighth Day of January, 2002

Attest:

JAMES E. ROGAN
*Attesting Officer*       *Director of the United States Patent and Trademark Office*